US006394540B1

(12) United States Patent
Manders

(10) Patent No.: US 6,394,540 B1
(45) Date of Patent: May 28, 2002

(54) OPEN ROOF CONSTRUCTION FOR A VEHICLE

(75) Inventor: Peter Christiaan Leonardus Johannes Manders, Horst (NL)

(73) Assignee: Inalfa Industries B.V. (NL)

( * ) Notice: Subject to any disclaimer, the term of this patent is extended or adjusted under 35 U.S.C. 154(b) by 0 days.

(21) Appl. No.: 09/616,168

(22) Filed: Jul. 14, 2000

(30) Foreign Application Priority Data

Jul. 20, 1999 (NL) .......................................... 1012645

(51) Int. Cl.$^7$ ................................................ B60J 7/057
(52) U.S. Cl. .................. 296/223; 296/216.08; 296/221
(58) Field of Search ....................... 296/216.06–216.08, 296/221–224

(56) References Cited

U.S. PATENT DOCUMENTS

| | | | |
|---|---|---|---|
| 4,417,763 A | 11/1983 | Schlapp et al. | |
| 4,619,480 A | 10/1986 | Motoyama et al. | 296/217 |
| 4,647,104 A | 3/1987 | Kohlpaintner et al. | 296/221 |
| 4,671,565 A | 6/1987 | Grimm et al. | |
| 4,684,169 A | 8/1987 | Igel et al. | 296/221 |
| 4,725,092 A | 2/1988 | Reintges et al. | 296/221 |
| 4,752,099 A * | 6/1988 | Roos et al. | 296/223 |
| 4,877,285 A | 10/1989 | Huyer | |
| 5,020,849 A | 6/1991 | Schlapp et al. | 296/221 |
| 5,058,947 A | 10/1991 | Huyer | |
| 5,066,068 A | 11/1991 | Suzuki et al. | 296/221 |
| 5,259,662 A | 11/1993 | Huyer | 296/221 |
| 5,527,085 A | 6/1996 | Ochiai et al. | 296/223 |
| 5,593,204 A | 1/1997 | Wahl et al. | 296/223 |
| 5,845,959 A | 12/1998 | Ueki | 296/221 |
| 6,164,178 A | 12/2000 | Stallfort | 296/222 |

FOREIGN PATENT DOCUMENTS

| | | |
|---|---|---|
| DE | 3442600 | 5/1986 |
| DE | 3603314 A1 | 8/1987 |
| DE | 3930756 | 3/1991 |
| DE | 9116412 | 2/1993 |
| DE | 4 405 742 | 5/1995 |
| DE | 195 14 585 | 10/1996 |
| EP | 0 033 816 | 8/1981 |
| EP | 0 143 589 | 6/1985 |

(List continued on next page.)

OTHER PUBLICATIONS

The Woodworkers' Store, catalog C–93, p. 10, "Stem Bumpers", received Oct. 19, 1995, 1993–1994.*
U.S. application No. 09/553,689, dated Apr. 21, 2000.
U.S. application No. 09/556,192, dated Apr. 21, 2000.
U.S. application No. 09/556,110, dated Apr. 21, 2000.
U.S. application No. 09/530,004, dated Apr. 21, 2000.
U.S. application No. 09/616,172, dated Jul. 14, 2000.
U.S. application No. 09/616,559, dated Jul. 14, 2000.
U.S. application No. 09/661,231, dated Sep. 13, 2000.

Primary Examiner—Dennis H. Pedder
(74) Attorney, Agent, or Firm—Westman, Champlin & Kelly, P.A.; S. Koehler

(57) ABSTRACT

An open roof construction for a vehicle having an opening in its fixed roof comprises a frame to be fixed to the roof, which includes at least one guide rail extending in the longitudinal direction of the open roof construction. A closure element supported by the frame is adjustable between a closed position, in which it closes the roof opening, and an open position, in which it releases the roof opening at least partially. An operating mechanism for adjustably supporting said closure element includes a slide which is capable of sliding movement in said guide rail and which is of U-shaped cross-section, at least locally. The slide is made up of two interconnected parts, with each part being L-shaped in section in at least two places. The bending lines between the legs of the L-shaped sections are staggered in said two places, preferably by a distance equal to the thickness of the material of the L-shaped parts.

13 Claims, 5 Drawing Sheets

FOREIGN PATENT DOCUMENTS

| | | |
|---|---|---|
| EP | 0 218 890 A | 4/1987 |
| EP | 0 343 750 | 11/1989 |
| EP | 0 517 318 A1 | 12/1992 |
| EP | 0 747 249 | 12/1996 |
| EP | 0 899 140 | 3/1999 |
| FR | 2 495 068 | 6/1982 |
| FR | 2 527 995 | 12/1983 |
| JP | 0278422 | * 12/1986 .................. 296/221 |
| JP | 0104734 | 5/1991 |
| JP | 404297323 | 10/1992 |

* cited by examiner

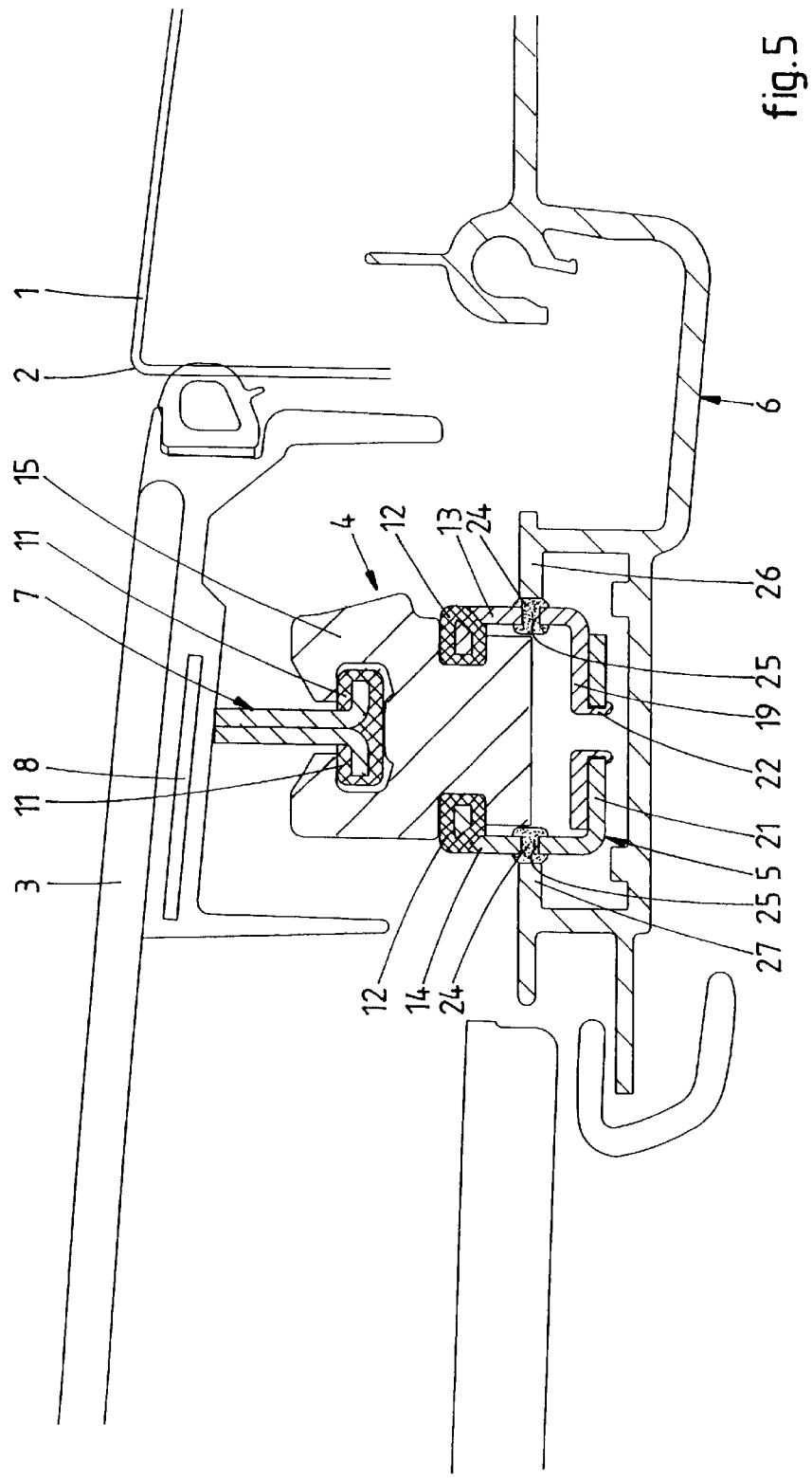

OPEN ROOF CONSTRUCTION FOR A VEHICLE

BACKGROUND OF THE INVENTION

The invention relates to an open roof construction for a vehicle having an opening in its fixed roof. The open roof construction includes a stationary part to be fixed to the roof, which includes at least one guide rail extending in the longitudinal direction of the open roof construction. An adjustable closure element is supported by said stationary part. The closure element is adjustable between a closed position, in which it closes the roof opening, and an open position, in which it releases the roof opening at least partially. An operating mechanism supports said closure element. The operating mechanism includes a slide which is capable of sliding movement in said guide rail and which is of U-shaped cross-section with vertical walls.

An open roof construction of this kind is described in Dutch patent application No. 1009773, for example. In said open roof construction, the U-shaped slide is bent of one metal sheet, wherein the vertical walls are interconnected by means of a horizontal connecting web in at least a number of places. One drawback of said slide is the fact that the resistance of the vertical walls to lateral bending forces is relatively small, since the bending line is relatively weak at the location of the bend to the connecting webs. This may result in lateral play between the slide and the guide rail directly from the outset or with the lapse of time. Likewise, other strength problems may develop.

The object of the present invention is to provide an improved open roof construction of the type referred to in the introduction.

SUMMARY OF THE INVENTION

According to a first aspect of the invention, the open roof construction includes a slide made up of two interconnected parts, with each part being L-shaped in section in at least two places. The section comprises two legs, one leg of which is formed by the respective vertical wall of the slide, and wherein the bending lines between the legs of the L-shaped sections are staggered in said two places, preferably by a distance equal to the thickness of the material of the L-shaped parts.

As a result of the position of the above-described bending lines, none of the vertical walls has a continuous bending about which the entire vertical wall can bend when a bending load is being exerted thereon. This increases the flexural strength of the vertical walls considerably, thus enhancing the resistance of the entire slide construction to deformation.

According to another aspect of the invention, the vertical walls of the U-shaped slide include sliding members of plastic material, which mate with, preferably, the edges of associated horizontal flanges of the guide rail. Preferably, the sliding members are spaced from the connecting web of the U-shaped slide, whilst the sliding members advantageously mate with the edges of the at least substantially horizontal flanges of the guide rail in the form of an extruded section that project furthest inwards.

Preferably, the dimensions of the slide in a transverse direction are selected so that the distance between the sliding surfaces of the sliding members is slightly larger than the distance between the opposite flanges of the guide rail. In this manner, the sliding members will fit between said flanges of the guide rail without play. Especially if the sliding members mate with an edge of the flanges, the sliding members will wear quickly to such a degree that they will guide the slide in a lateral direction without any play. When the sliding members are disposed some distance away from the connecting webs of the U-shaped slide, the vertical walls of the slide can be pressed slightly together upon being introduced into the guide rail. In this manner, the sliding members can be placed between the flanges of the guide rail with some bias. When the sliding members are formed relatively high on the vertical walls, they will also prevent the vertical walls from bending outwards, for example in the case of outward bending forces which can develop as a result of attempts to break into the vehicle by prying open the closure element. Thus, the sliding members contribute towards the stability and the security of the operating mechanism.

BRIEF DESCRIPTION OF THE DRAWINGS

The invention will be explained in more detail hereafter with reference to the drawings, which schematically show an exemplary embodiment of the open roof construction according to the invention.

FIGS. 4 and 5 are larger-scale sectional views along lines IV—IV and V—V, respectively, in FIG. 1, wherein the closure element is shown in the closed position, however.

DESCRIPTION OF THE ILLUSTRATIVE EMBODIMENT

Figure 1:
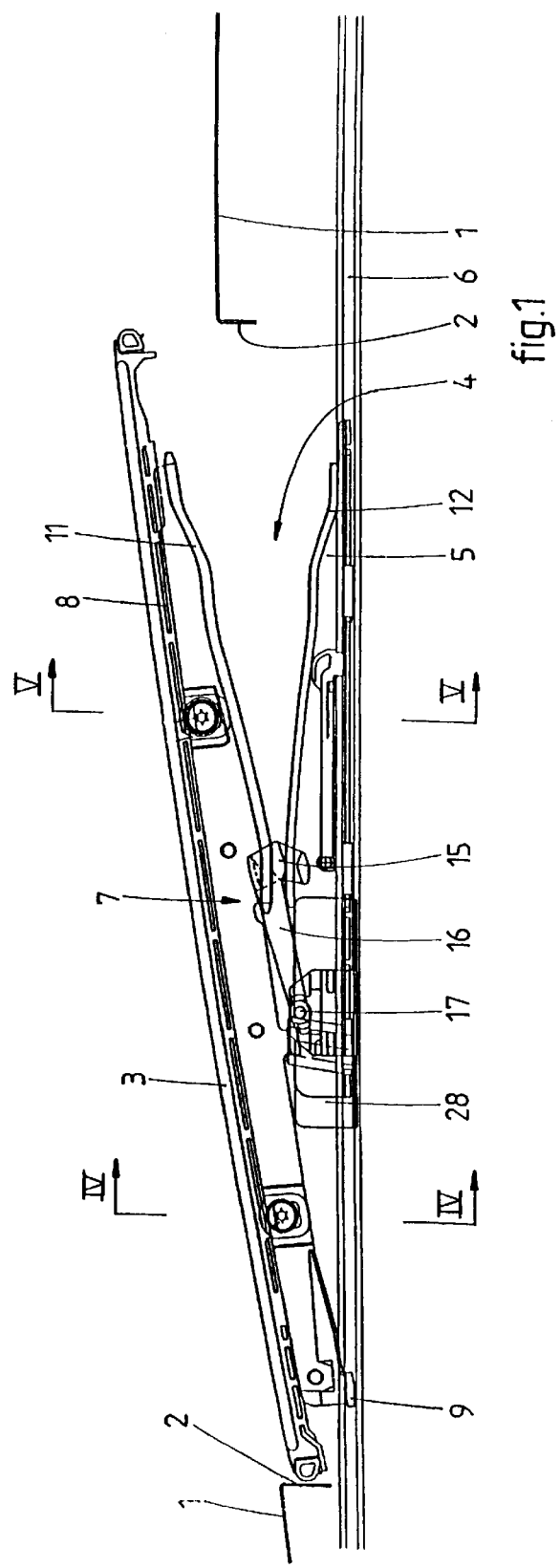
FIG. 1 is a longitudinal sectional view of an embodiment of the open roof construction according to the invention, showing a closure element in an open ventilating position.

The open roof construction as shown in the drawings constitutes the subject matter of further co-pending patent applications both entitled "Open Roof Construction for a Vehicle" Ser. No. 09/616172, filed Jul. 14, 2000 and Ser. No. 09/616559, filed Jul. 14, 2000, the contents of which are incorporated herein by reference.

The drawings show a fixed roof 1 of a vehicle, such as a passenger car, which is provided with a roof opening 2 for receiving an open roof construction. The open roof construction includes a closure element 3 for selectively closing or at least partially releasing the roof opening 2. In this embodiment, the closure element 3 is a rigid panel, in particular a transparent panel of glass or plastic material, but also other closure elements such as slats or a flexible cover are conceivable. In the illustrated embodiment a sliding-tilt roof is illustrated, wherein panel 3 can be moved from the closed position in roof opening 2 (FIGS. 4, 5), on the one hand to an upwardly and rearwardly sloping ventilating position (FIG. 1) and, on the other hand, downwards (FIG. 5) and subsequently rearwards to a position under the fixed roof 1. Other embodiments are possible, however, such as a spoiler roof or a tilt roof or the like.

In order to enable the movements of panel 3, panel 3 is fitted with an operating mechanism 4 at both edges extending in the longitudinal direction of the open roof construction. In this embodiment, each of the operating mechanisms 4 includes a link slide 5, which is slidably accommodated in a guideway of a guide rail 6. Said guide rail 6 is mounted on or forms part of a stationary part (not shown), for example a frame, which is attached to the fixed roof 1 of the vehicle. The guide rails 6 extend along the longitudinally extending edges of the roof opening 2 and possibly rearwards thereof.

Part of the operating mechanism 4 is made up of a link 7, which is attached to the underside of panel 3, near the respective longitudinal edge. The link 7 can include a stiffening frame 8. At its front end, link 7 is fitted with a sliding shoe 9, which is slidably accommodated in associated grooves in guide rail 6, and which also functions as the front hinge for panel 3. Link slide 5 comprises two pairs of sliding shoes 10, which project laterally and which guide link slide 5 in guide rail 6.

Both link slide 5 and link 7 include guideways in the form of laterally projecting ribs 11, 12, wherein ribs 11 are formed on the lower edge of link 7 and extend away from each other, whilst ribs 12 are formed on the upper side of vertical walls 13, 14 of the link slide 5 and extend towards each other. A guide head 15 is in engagement with ribs 11 and 12, and to that end it engages between the vertical walls 13, 14 of link slide 5 and around link 7.

Guide head 15 is formed on the free end of an arm 16, which is pivotally connected, via a pivot 17, to a driving slide 28 (FIG. 1), which is drivingly connected to a drive unit, such as an electric motor, a hand crank or the like, via driving cables (not shown) or the like. By moving the guide head 15, which acts as a wedge between link slide 5 and link 7, with respect to guideways 11, 12, link 7 and thus panel 3 will be pivoted about pivot 9. Link slide 5 is stationary during said pivoting. In the lower pivoted position of panel 3, the driving slide is locked in position with respect to link slide 5, after which the entire operating mechanism 4 and panel 3 will move rearwards as one unit upon further rearward movement of the driving slide.

Figure 3:
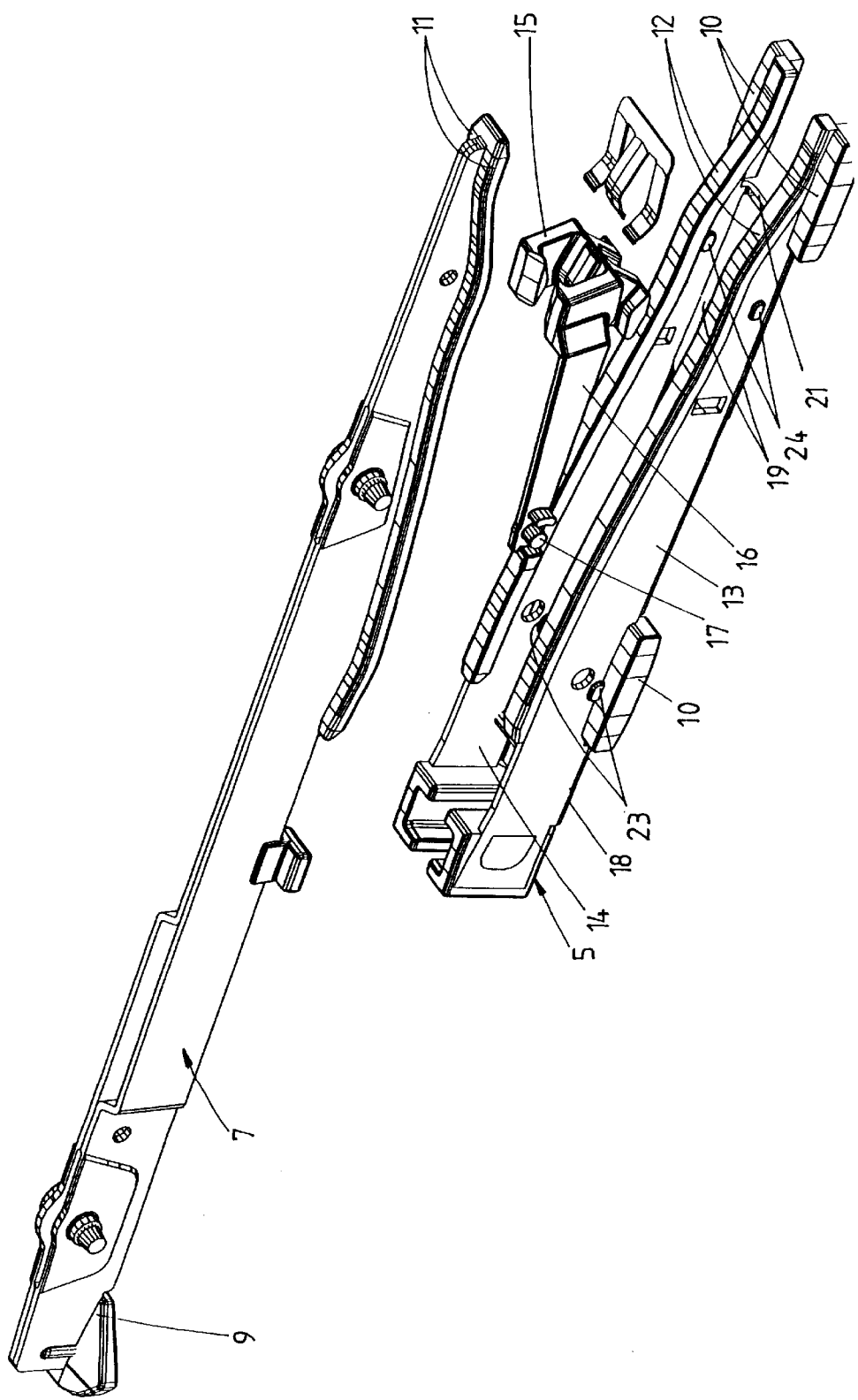
FIG. 3 is a perspective, exploded view of the operating mechanism of FIG. 2.
Figure 4:
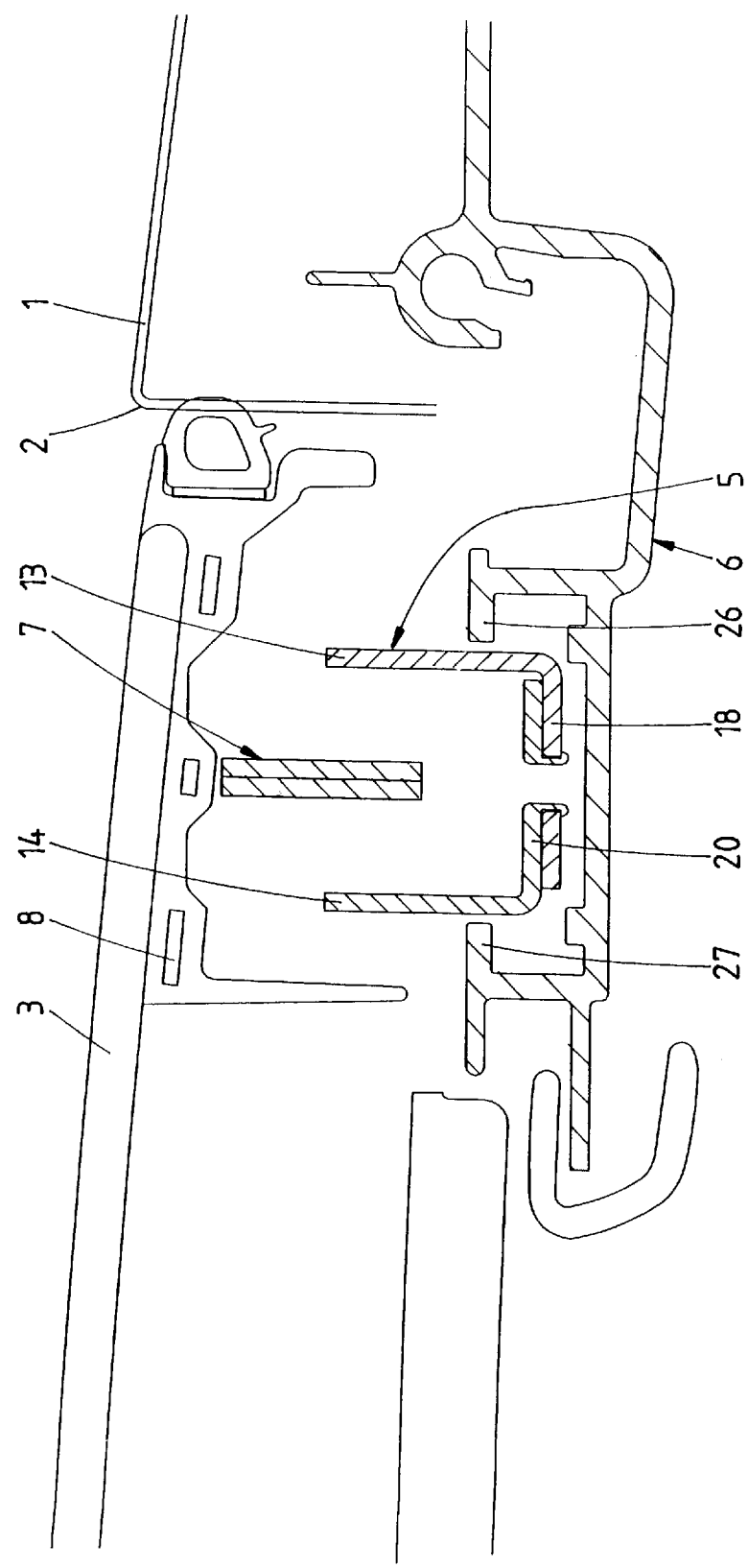

FIGS. 3, 4 and 5 show the construction of the link slide 5 more clearly. Link slide 5 is formed of sheet metal, in this case by cutting and bending. In the illustrated embodiment, the link slide 5 is formed of two sheet metal parts, which each comprise the associated vertical walls 13 and 14, respectively. On the lower side of each, two pairs of lips 18, 19 and 20, 21, respectively, are formed. FIG. 4 is a sectional view of front lips 18, 20, whilst FIG. 5 is a sectional view of rear lips 19, 21. As is shown in the figures, the front lip 20 present on vertical wall 14 is positioned on the front lip 18 of vertical wall 13 and is attached thereto, for example by means of an embossing rivet 22. In the section shown in FIG. 5, this construction is exactly the reverse: the rear lip 19 present on vertical wall 13 is positioned on the rear lip 21 of vertical wall 14. At the location of the lips, the parts of the link slide 5 are L-shaped in section, with the vertical walls 13, 14 and lips 18–20 functioning as legs of the L, whilst the parts together define a U-shaped section of slide 5 at the location of lips 18–21. The lips form the connecting web and vertical walls 13, 14 form the legs of said U-shaped section.

In FIGS. 4 and 5 the front lip 18 of wall 13 and the rear lip 19 of wall 13 are shown to be staggered in vertical direction, in this case by a distance equal to the thickness of the material of the lips. As a result, also the bending lines of lips 18, 19 will be staggered and not be in alignment. Therefore, the vertical wall 13 does not have a common bending line with the web of the U-section. As a result of this construction, the resistance to bending of the vertical wall 13 is increased considerably and a stable construction is provided. The same holds for the lips 20, 21 of wall 14, which are staggered in exactly the opposite manner.

Figure 2:
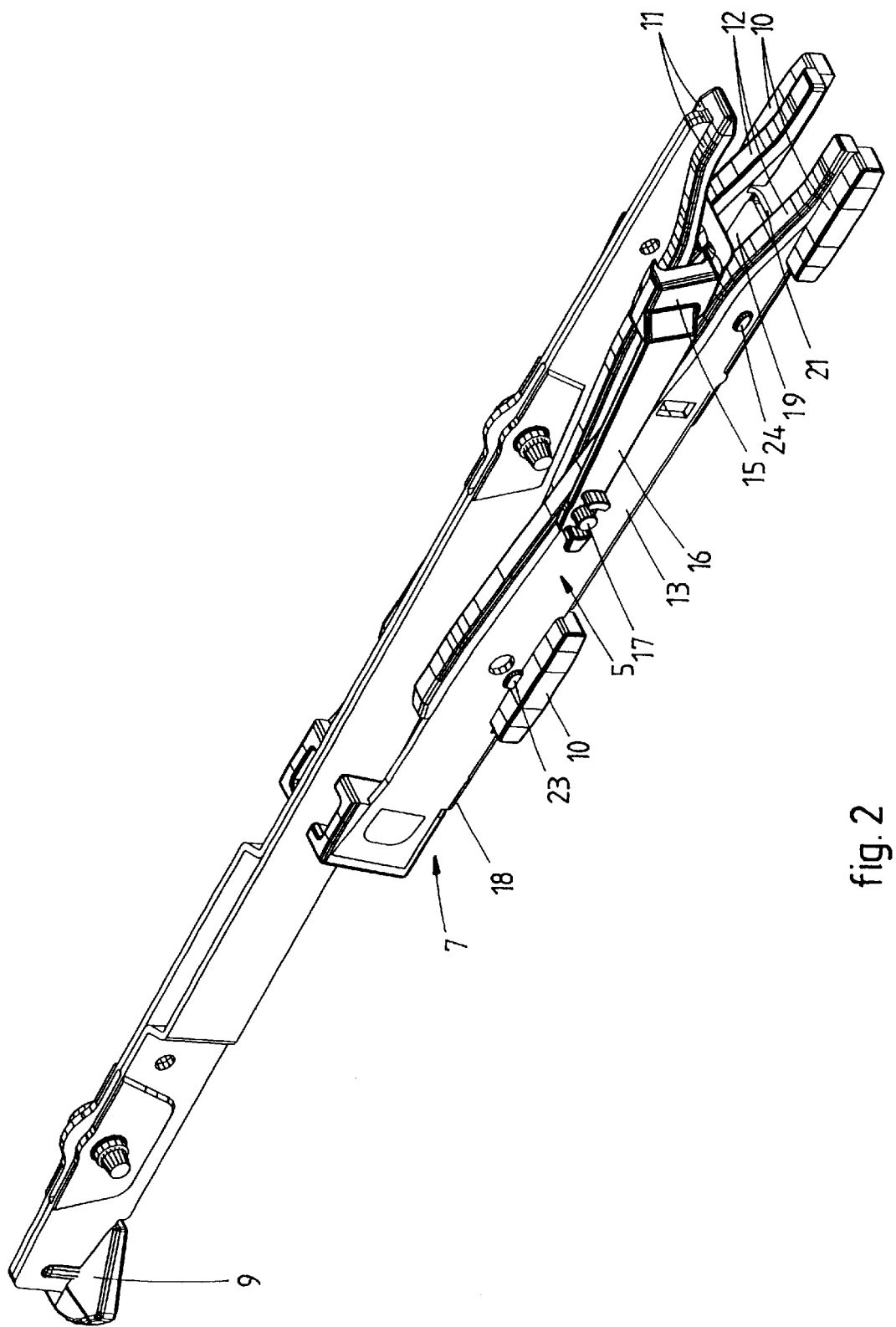
FIG. 2 is a larger-scale perspective view of an operating mechanism on one side of the open roof construction of FIG. 1, showing the closure element in the closed position.

As is furthermore shown in FIGS. 2, 3 and 5, the vertical walls 13, 14 of link slide 5 include sliding members 23, 24. In the illustrated embodiment, the sliding members 23, 24 comprise studs which have been formed thereon by injection molding and which are anchored in holes 25 in vertical walls 13, 14. Preferably, the sliding studs 23, 24 are formed on the respective part of the link slide 5 together with rib 12 and sliding shoes 10. The front sliding studs 23 are positioned above the front sliding shoes 10 on link slide 5, whilst the rear sliding studs 24 are positioned at the location of the part of ribs 12 where guide head 15 is present in the closed position of panel 3. The sliding studs 23, 24 are formed on vertical walls 13, 14 some distance above lips 18–21 of U-shaped link slide 5. The sliding studs 23, 24 mate with the inner edges of facing horizontal flanges 26 and 27, respectively, of the guide rail 6, which is in the form of an extruded section. Sliding studs 23, 24, together with flanges 26, 27, provide the lateral guidance of the link slide 5 in guide rail 6. Said lateral guidance takes place separately from the vertical guidance by the sliding shoes 10 of link slide 5.

The above-described construction of link slide 5 has several advantages. Upon manufacture of link slide 5, the parts of which it is formed must be bent over so as to bend lips 18–21 with respect to walls 13, 14. Said bending over will generally take place with a tolerance such that the angle between the lips and the associated walls will be 90 degrees or larger at all times. The vertical walls 13, 14 are inclined outwards to a very small degree, therefore. The dimension of the sliding studs 24, 25 is selected such that in the eventual form of the link slide 5 the distance between the outside of the opposite sliding studs 23 and 24, respectively, will be slightly larger at all times than the distance between the opposite inner edges of flanges 26, 27. Said distance between the inner edges of flanges 26, 27 is a dimension with a very small tolerance, since it is an inside dimension of the section without additional tolerances. When slide 5 is being mounted in guide rail 6, the vertical walls 13, 14 will be pressed together slightly, as a result of which the sliding studs 23, 24 will be slightly biased against the edges of flanges 26, 27. The sliding studs 23, 24 will wear quickly as link slide 5 makes its first movements in guide rail 6, until said bias has reduced, after which slide 5 will be capable of sliding movement in guide rail 6 without any lateral play. When the bias between the sliding studs 23, 24 and the flanges 26, 27 has reduced, there will no longer be any substantial wear on sliding studs 23, 24. The narrow surface of the edges of flanges 26, 27 is conducive to the process of the sliding studs 23, 24 wearing to the correct dimension.

The sliding studs 23, 24, and in particular the sliding studs 24, furthermore provide increased resistance of the walls 13, 14 of the curve slide to bending outwards, for example when an attempt is made to break into the vehicle, whereby it is attempted to pry open panel 3. The guide head 15 must be pulled up out of the slide in that case, and to that end the vertical walls 13, 14 must be bent outwards. The sliding studs 24, which are positioned at the location of guide head 15 in the closed position of panel 3, inhibit the vertical walls 13, 14 from bending outwards in that they abut against flanges 26, 27.

From the foregoing it will be apparent that the invention provides an open roof construction for a vehicle which is remarkable for the strong, stable construction of its operating mechanism, which can move precisely and without any play.

The invention is not restricted to the above-described embodiment as shown in the drawing, which can be varied in several ways without departing from the scope of the invention. Thus, the lips of the parts of the U-shaped slide could also fit together via a form lock in the same plane, after which they are fixed together, for example by deformation of said form lock. The bending lines will not be staggered in all cases, and only one lip may be provided. The advantage of such a dual construction is that, as in the illustrated embodiment, it is possible to use parts formed by injection molding, which injection molding can take place after bending of the parts, but before said parts are connected together.

What is claimed is:

1. An open roof construction for a vehicle having an opening in a fixed roof, comprising:
   at least one guide rail extending in a longitudinal direction of the opening;
   an adjustable closure element supported by the guide rail, which is adjustable between a closed position, in which it closes the roof opening, and an open position, in which it opens the roof opening at least partially;
   a slide adapted for sliding movement in the guide rail and coupled to the adjustable closure element to support the closure element, the slide being U-shaped cross-section and formed from two interconnected parts, with each part being L-shaped in section in at least two places, said section comprising two legs, wherein bending lines between the legs of said L-shaped sections are staggered in said two places by a distance at least equal to a thickness of a material of the L-shaped parts.

2. The open roof construction according to claim 1, wherein the L-shaped parts of the slide include vertical walls and at least two substantially horizontal lips, wherein the extent to which the lips of one part are staggered, seen in a vertical direction, is at least substantially the same, albeit in an opposite direction, as the extent to which the lips of the other part are staggered, such that a first lip of one part is disposed under a first lip of the other part, and a second lip of one part is disposed on a second lip of the other part.

3. The open roof construction according to claim 2, wherein the vertical walls of the U-shaped slide include sliding members of plastic material, which mate with edges of associated horizontal, opposite flanges of the guide rail.

4. The open roof construction according to claim 3, wherein the U-shaped slide includes a guiding and supporting rib on an upper side of each vertical wall, wherein the two ribs face towards each other and wherein a guide engages said ribs from the inside is guided on said ribs, which guide transmits forces from the closure element to the U-shaped slide.

5. The open roof construction according to claim 4, wherein said sliding members are provided on the U-shaped slide at a location of said guiding and supporting ribs at a location where said guide is present in the closed position of the closure element.

6. The open roof construction according to claim 4, wherein the vertical walls comprise metal, wherein said guiding and supporting ribs and said sliding members have been formed on the metal vertical walls by injection molding, and wherein the slide includes sliding shoes adapted to slide in the guide rail, the sliding shoes being formed by injection molding simultaneously with the sliding members.

7. An open roof construction for a vehicle having an opening in a fixed roof, comprising:
   at least one guide rail having opposed flanges extending in a longitudinal direction of the opening;
   an adjustable closure element supported by the guide rail, which is adjustable between a closed position, in which it closes the roof opening, and an open position, in which it opens the roof opening at least partially;
   a slide adapted for sliding movement in the guide rail and coupled to the adjustable closure element to support the closure element, the slide including sliding shoes adapted for guiding the slide in a vertical direction in the guide rail and sliding members comprising projections from the slide and spaced apart from said sliding shoes, which sliding members provide guidance of the slide transversely to the guide rail and which abut against the opposed flanges of the guide rail.

8. The open roof construction according to claim 7, wherein the opposed flanges are formed of an extruded section of the guide rail and are substantially horizontal and project toward each other, and wherein the sliding members mate with edges of the substantially horizontal flanges.

9. The open roof construction according to claim 7, wherein said slide includes two vertical walls which are spaced apart in a transverse direction to the guide rail, the walls being interconnected by a connecting web, and wherein the sliding members are disposed on the slide some vertical distance apart from the connecting web.

10. The open roof construction according to claim 7, wherein the sliding shoes and the sliding members are formed on the slide in one operation by injection molding.

11. The open roof construction according to claim 7, wherein the sliding members are sliding studs, which are anchored in holes through the slide.

12. An open roof construction for a vehicle having an opening in a fixed roof, comprising:
   at least one guide rail having opposed flanges extending in a longitudinal direction of the opening;
   an adjustable closure element supported by the guide rail, which is adjustable between a closed position, in which it closes the roof opening, and an open position, in which it opens the roof opening at least partially;
   a slide adapted for sliding movement in the guide rail and coupled to the adjustable closure element to support the closure element, the slide being U-shaped in cross-section with vertical walls, the vertical walls including sliding members of plastic material, which mate with an edge of an associated horizontal flange of the guide rail.

13. An open roof construction for a vehicle having an opening in a fixed roof, comprising:
   at least one guide rail having opposed flanges extending in a longitudinal direction of the opening;
   an adjustable closure element supported by the guide rail, which is adjustable between a closed position, in which it closes the roof opening, and an open position, in which it opens the roof opening at least partially;
   a slide adapted for sliding movement in the guide rail and coupled to the adjustable closure element to support the closure element, the slide being U-shaped in cross-section with vertical walls, wherein said slide is formed of two interconnected parts, wherein each part is at least partially L-shaped in section, comprising an at least substantially horizontal connecting lip and a vertical wall, with the connecting lips of the two parts being interconnected.

* * * * *